US011229319B2

(12) United States Patent
Lange

(10) Patent No.: US 11,229,319 B2
(45) Date of Patent: Jan. 25, 2022

(54) GRILL DEVICE AND COUPLING AND CORRESPONDING PLATE FOR FOOD TO BE GRILLED

(71) Applicant: WINNINGER FERIENINSEL THOMAS LANGE E.K., Winningen (DE)

(72) Inventor: Thomas Lange, Winningen (DE)

(73) Assignee: WINNINGER FERIENINSEL THOMAS LANGE E.K., Winningen (DE)

( * ) Notice: Subject to any disclaimer, the term of this patent is extended or adjusted under 35 U.S.C. 154(b) by 1155 days.

(21) Appl. No.: 15/535,454

(22) PCT Filed: Dec. 4, 2015

(86) PCT No.: PCT/EP2015/002449
§ 371 (c)(1),
(2) Date: Jun. 13, 2017

(87) PCT Pub. No.: WO2016/091371
PCT Pub. Date: Jun. 16, 2016

(65) Prior Publication Data
US 2017/0325631 A1 Nov. 16, 2017

(30) Foreign Application Priority Data
Dec. 8, 2014 (DE) ...................... 10 2014 018 023.9

(51) Int. Cl.
*A47J 37/04* (2006.01)
*A47J 37/06* (2006.01)

(52) U.S. Cl.
CPC ......... *A47J 37/043* (2013.01); *A47J 37/0694* (2013.01)

(58) Field of Classification Search
CPC ........ A47J 37/04; A47J 37/043; A47J 37/049; A47J 37/0694
(Continued)

(56) References Cited

U.S. PATENT DOCUMENTS 2,622,506 A * 12/1952 Finizie ................. A47J 37/043
99/337
2,831,421 A 4/1958 Mele
(Continued)

FOREIGN PATENT DOCUMENTS

DE 102006021669 A1 11/2007
DE 102013020112 A1 10/2014
(Continued)

OTHER PUBLICATIONS

International Search Report for PCT/EP2015/002449; 3 pgs.
Written Opinion for PCT/EP2015/002449; 5 pgs.

*Primary Examiner* — Dana Ross
*Assistant Examiner* — James F Sims, III
(74) *Attorney, Agent, or Firm* — Schmeiser, Olsen & Watts, LLP

(57) ABSTRACT

A grill device for grilling food to be grilled, to a coupling and to a plate for food to be grilled is provided. The grill device includes at least one frame having at least one frame element and at least one holding element, arranged at one end of the frame element. The grill device can be rotated about a vertical longitudinal axis A and is suspended or supported upright along the vertical rotational axis. At least one support element for food to be grilled is arranged thereon. The at least one support element has a first portion which has an opening through which the frame element can be inserted. The frame element has a non-rotationally symmetrical cross-section such that the support element for the food to be grilled and the frame element cooperate by (Continued)

interlocking with respect to a normal plane N of the vertical longitudinal axis A.

10 Claims, 8 Drawing Sheets

(58) Field of Classification Search
USPC ................................. 99/416; 126/333, 337 R
See application file for complete search history.

(56) References Cited

U.S. PATENT DOCUMENTS 5,826,497 A     10/1998   Basso
7,140,362 B1 *   11/2006   Johnston ............... A47J 37/049
                                                                                          126/25 A

FOREIGN PATENT DOCUMENTS

FR             2379272 A1    9/1978
WO           03022115 A2    3/2003
WO      WO03022115 A2    3/2003

* cited by examiner

GRILL DEVICE AND COUPLING AND CORRESPONDING PLATE FOR FOOD TO BE GRILLED

CROSS-REFERENCE TO RELATED APPLICATIONS

This application claims priority to PCT Application No. PCT/EP2015/002449, having a filing date of Dec. 4, 2015, which is based upon and claims priority to DE Application No. 10 2014 018 023.9, having a filing date of Dec. 8, 2014, the entire contents both of which are hereby incorporated by reference.

FIELD OF TECHNOLOGY

The following relates to a grill device for grilling food to be grilled, to a coupling for the grill device and to a plate for food to be grilled for use in a grill device.

BACKGROUND

In the previously known grill devices for grilling food are known, which for securing individual elements, in particular the support for food to be grilled, require additional fastening elements, such as for example screws, in order to ensure a secure connection between the support for food to be grilled and the frame associated therewith.

In this case it is disadvantageous that the removal as well as the mounting of the support for food to be grilled is complicated by the additional fastening means. Furthermore, the material of the fastening means can deform due to the heat in such a way that detachment is no longer possible or at least is made difficult.

SUMMARY

An aspect relates to a grill device which enables easier removal or easier and reliable mounting and adjustment of the support for food to be grilled. In particular the reliability for the operator during operation of the device should be increased. Moreover, a plate for food to be grilled should be provided which is configured for various kinds of food to be grilled.

The following relates to a grill device for grilling food, comprising at least one frame, with at least one frame element and with at least one holding element, for example an upper holding element and/or a lower holding element, which is arranged at an upper end of the frame element, wherein the grill device is rotatable about a vertical longitudinal axis. Furthermore, it can be equipped with at least one support element for food to be grilled or can be suitable for holding it. In particular, the grill device may be suspended, in the case of an upper holding element, and/or, in the case of a lower holding element, can be supported upright along the vertical rotational axis. A core idea of embodiments of the invention is that the frame element is arranged eccentrically with respect to the vertical rotational axis, so that the food to be grilled can be arranged centrally. In particular, the food to be grilled can be arranged horizontally, without the need to fix it separately, for example by skewering. The central arrangement of the food to be grilled has the advantage that during rotation about the vertical rotational axis it can have a substantially constant spacing (as a function for example of the shape of the food to be grilled), so that it can be cooked peripherally as uniformly as possible.

The at least one support element for food to be grilled can have a first portion which has an opening through which the frame element can be inserted. In this case the frame element has a non-rotationally symmetrical cross-section such that the support element for the food to be grilled and the frame element co-operate by interlocking with respect to a plane in which the vertical longitudinal axis does not lie, i.e. for example a normal plane of the vertical longitudinal axis. Thus the support element for food to be grilled can be moved only in the direction of the vertical longitudinal axis, but cannot turn in a direction orthogonal thereto. A non-rotationally symmetrical cross-section is advantageous with respect to the interlocking, since in rotationally symmetrical cross-sections there is a danger of unwanted movement or slipping of the support element for food to be grilled. In this case the longitudinal axis is understood to be the axis in which the grill device has its longest geometric dimensions. Preferably the longitudinal axis is simultaneously the central axis of the grill device. In particular the vertical longitudinal axis can be oriented in the direction of gravity. By rotation of the grill device about a vertical longitudinal axis a uniform grilling of the food to be grilled is made possible. Consequently this is a vertical grill device.

Further advantageous embodiments are disclosed by the subordinate claims.

Furthermore, the support element for food to be grilled preferably has an asymmetric weight distribution with respect to the opening, so that the support element for food to be grilled and the frame element co-operate with respect to the vertical longitudinal axis by force fitting, in particular by a clamp connection. Due to this asymmetric weight distribution, for example due to gravity the support element for food to be grilled is brought into a position in which the support element for food to be grilled is clamped to the frame element, so that a frictional connection can be achieved. In this way it is possible, in a simple and quickly adjustable manner, to obtain a reliable connection, even without additional fastening means, which would have to be attached to the hot frame element which is generally covered with fat and food residues. In this connection at least two contact points are produced between the opening and the frame element. A force fitting connection along the vertical longitudinal axis, but a preferably interlocking connection in directions orthogonal thereto between the support element for food to be grilled and the frame element is advantageous, since the support element for food to be grilled should be pivoted together with the frame element. In this case, however, it should be ensured that the support element for food to be grilled remains in the previously fixed position during the rotation. In this case the force fitting connection must be designed for the forces occurring due to the continuous rotation, so that slipping is prevented, even if the contact surfaces are wetted with a substance with a lubricating effect, such as for example fat.

Particularly preferably the opening of the first portion of the support for food to be grilled has, in a horizontal direction, a length which is greater than the thickness of the frame element. Due to this design it is ensured that the support for food to be grilled can be easily guided over the frame element by means of the frame element, without premature tilting or jamming.

In a further preferred embodiment, in a form fitting connection position the first portion of the support for food to be grilled has an inclination with respect to the normal plane. Accordingly the first portion is not oriented horizontally, but is inclined in order to produce a clamp connection. A reliable connection is achieved by such clamping.

The support element for food to be grilled preferably has a second portion which is configured to receive the food to be grilled itself or at least to receive a plate for food to be grilled. For this purpose the second portion can be configured for example directly as a plate for food to be grilled, which can directly receive the food to be grilled. The second portion is preferably formed for example by a receiving device such as two struts, which can receive a separate plate for food to be grilled. An advantage of the configuration of the second portion as a receiving arrangement is that the plate for food to be grilled can be replaced more simply and more quickly. In the event of possible damage to the plate for food to be grilled, it is only necessary to replace the plate itself and not the entire support element for food to be grilled. Furthermore, with regard to different types of food to be grilled, the support element for food to be grilled is more variable, since when the food to be grilled is changed it is only necessary to use another plate for food to be grilled.

In a further preferred embodiment, in a horizontal direction away from the frame element the second portion has a length which is at least three times as great as the length of the first portion in this direction. The asymmetric weight distribution is favoured by the different size ratios. Furthermore, a greater length of the second portion enables a material weight which is sufficient in order to provide a sufficient static friction of an inner region of the opening on the frame element, so that the support element for food to be grilled remains fixed in its position on the frame element. A greater length of the second portion also makes possible a second portion which is large enough to receive a correspondingly large piece of food to be grilled. An advantageous shape for the second portion is a shape which is approximately adapted to a plate. However, the shape of the second portion is not limited thereto. It is conceivable that the first and second portion together have approximately the shape of a tongue which widens, starting from the first portion, and then converges again in a round shape. In this way a good retention on the frame element can be simultaneously ensured with an advantageous surface for a piece of food to be grilled. Furthermore in this way it is advantageously very simple to remove the food to be grilled or to introduce the food to be grilled, since a receiving space for the food to be grilled is only covered by a frame element and thus the food to be grilled is accessible from all sides in a 360° range.

Furthermore it is advantageous that the at least one support element for food to be grilled is preferably formed with a substantially L-shaped section. According to embodiments of the invention, "L-shaped" should be understood to mean all sections which consist of two sub-sections which are at an angle relative to one another with an angular or rounded connecting piece.

In a position of a form fitting connection between the support element for food to be grilled and the frame element, the second portion preferably extends substantially in a horizontal direction. Such a horizontal orientation is necessary so that the food to be grilled which is located on the second portion is prevented from slipping off Particularly preferably, the frame element has a further holding element on the underside of the frame element and/or a guide in the normal plane. A guide is particularly advantageous in this region in order to avoid oscillation of the frame during rotation.

In a further advantageous embodiment the frame element is produced by drawing and has a curved region. In this case the profile tapers in the curved region. The taper is provided particularly preferably on the outer face of the profile, that is to say in the region of the curvature which has the greatest radius of curvature.

In a preferred embodiment of the grill device an anti-friction bearing is arranged above the upper holding element in the direction of the vertical longitudinal axis. In this case a part of the upper holding element extends upwards in the direction of the vertical longitudinal axis and is guided by the anti-friction bearing.

The part of the upper holding element which is guided by the anti-friction bearing preferably has at least one bearing surface for the holding element to bear on the anti-friction bearing. This bearing surface can bear on the inner ring of the anti-friction bearing or can be fastened thereon. This offers the advantage that the weight of the frame is supported by the bearing, which leads to a reduced loading of the drive.

According to embodiments of the invention a coupling with a piston and a cylinder is provided for transmission of a rotational movement to a frame of a grill device. According to embodiments of the invention the coupling between the piston and the cylinder is a force fitting coupling. Particularly preferably, the force fitting coupling is a slip coupling. Such a coupling offers a considerable safety advantage, since it disengages automatically when a maximum force is exceeded. In the event that the operator for example puts his hand or his arm between two rotating supports for food to be grilled, the coupling disengages and thus stops the rotation of the support for food to be grilled.

In a preferred embodiment of the coupling the piston and the cylinder have a rotationally symmetrical cross-section in the axial direction.

In a further preferred embodiment the coupling has a number of contact surfaces which are suitable for production of a defined force fit between the piston and the cylinder.

The number of contact surfaces are preferably arranged so as to be radially movable in the piston or the cylinder, wherein the contact surfaces produce a force fit by a pressing force in the radial direction.

In a further preferred embodiment the number of contact surfaces is connected to a pressing element which applies a pre-defined force to the contact surfaces. In this case, when a defined threshold value of the pressing force is exceeded the piston and the cylinder are movable with respect to one another. The pressing element may for example be a spring of which the spring constant is fixed in such a way that the necessary force is generated.

An underside of the piston is preferably formed as a contact surface which is movable in the axial direction and by which a force fit can be produced in the axial direction.

Furthermore, a locking device is preferably provided by which the contact surfaces can be locked in a position in which no force fit is produced.

In a further preferred embodiment the coupling is thermally isolated by an element for thermal insulation of a grill device. In a preferred embodiment this element for thermal insulation can be formed simultaneously as a bearing element.

Moreover, according to embodiments of the invention a plate for food to be grilled is provided for use in a grill device. The plate for food to be grilled is provided with a guide on the underside which is adapted to the shape of the second portion of the support for food to be grilled, so that the plate for food to be grilled can be mounted on the second portion of the support element for food to be grilled. The guide may be a number of elongate indentations if the second portion is formed by struts. However, openings of other shapes are conceivable which are adapted to the respective configuration of the second portion.

In a preferred embodiment the plate for food to be grilled has at least one protuberance for holding a piece of food to be grilled with a cavity. The protuberances may be inter alia pins which are introduced into the food to be grilled. These pins can also be heated in order also to heat the food to be grilled from the inside, which can lead to more uniform cooking.

In a preferred embodiment the frame, the frame element as well as the holding element are made from metal, for example from stainless steel or aluminium. Furthermore, it is conceivable that the surfaces of the frame elements as well as the holding elements are physically and/or chemically modified and are used for example with a surface treatment or a surface coating. This is advantageous in particular in contact with food items, since due to the surface treatment the growth of bacteria as well as the growth of fungi is prevented, so that the frame is antimicrobial and/or can be disinfected. Furthermore, it is conceivable that the frame, the frame element as well as the holding elements are formed as a wire bending construction.

Furthermore, the grill device according to embodiments of the invention comprises at least one support element for food to be grilled to receive the food to be grilled. This is advantageous, since the food to be grilled can thus be arranged in the grill device and can be cooked during a grilling operation.

In a further advantageous embodiment at least one, preferably several, support elements for food to be grilled are arranged vertically spaced apart from one another on the retaining frame. This is advantageous since in particular each support element for food to be grilled preferably receives an item of food to be grilled, for example a chicken to be grilled. If a plurality of such support elements for food to be grilled are arranged on the retaining frame, a plurality of chickens can be grilled simultaneously.

The support elements for food to be grilled can preferably be arranged spaced apart from one another in such a way that the respective pieces of food to be grilled are arranged without contact with one another. This is advantageous since in this way the food to be grilled can be grilled from all sides and raw neck regions, such as are caused by the tight fitting on the skewers and are known from the prior art, are avoided. This is additionally advantageous since, due to the spacing of the pieces of food to be grilled apart from one another, fast removal of each individual piece of food to be grilled as well as fast introduction of new pieces of raw food to be grilled is possible. Depending upon the size of the food to be grilled, the food, in particular a chicken to be grilled, can be removed individually from the grill device without in any way affecting the rest of the food to be grilled. If a smaller chicken to be grilled is cooked, it can be removed immediately, in order to ensure a succulent meat quality. The rest of the food to be grilled, that is to say larger, heavier chickens to be grilled which are not yet cooked, meanwhile remain in the grill device and continue to be grilled. This produces both a time advantage and also a reduced amount of work.

The frame element advantageously has a plurality of indentations vertically spaced apart from one another which in the simplest case are preferably formed as guide grooves. The at least one support element for food to be grilled can be at least partially introduced and releasably fixed in these indentations. Depending upon the configuration these indentations can have the same or also different spacings relative to one another. This variable arrangement of the at least one support element for food to be grilled is in particular advantageous when pieces of food of different sizes are to be grilled. Advantageously a plurality of support elements for food to be grilled, preferably two to ten support elements for food to be grilled, are arranged on the retaining frame. Furthermore, the support elements for food to be grilled are preferably arranged vertically spaced apart from one another in the range from 10-30 cm.

The indentations can advantageously provide a further support function for the static friction. They are preferably arranged as notches on a side of the frame element which is directed towards the second portions and on a side of the frame element remote therefrom. This produces a particularly simple and at the same time stable support function.

In a further advantageous embodiment the frame element is formed as a square tube with a preferably square cross-section and particularly preferably with rounded corners. This is advantageous since it is a simple embodiment which at the same time is particularly beneficial for the functionality. In this way it is possible to make the opening on the first portion rectangular with a side which corresponds to the length of the square tube as well as a relatively long side. In an inclined position the longer length is then also adapted to the square tube. In this way it is possible particularly simply to achieve the condition that an inclined position of the first portion relative to the vertical longitudinal axis exists, in which the opening interlocks with the frame element and the second portion is perpendicular to the vertical longitudinal axis. It is advantageously conceivable that indentations are formed as notches at different heights. In this case one notch advantageously faces the second portion on the frame element and one faces away from the second portion on the frame element. The height difference is advantageously adapted in such a way that an oblique connection of the two indentations corresponds exactly to a second rectangular length of the opening. In this way stepped height adjustments of the support element for food to be grilled can be ensured. Of course the shape of the frame element is not limited to the shape of a square tube. Thus the shape of a round tube, the shape of a rectangular tube or the shape of an elliptical tube is also possible. Also all other conceivable profile shapes are conceivable. For example, for advertising purposes the shape of a frame element can also be adapted to a cartoon character. Instead of a tube a solid rod can also be used. This advantageously increases the stability. The rounded corners are advantageous, since in this way the danger of injury is prevented.

In a further advantageous embodiment, on the frame element on the periphery below the support element for food to be grilled there is a bulge, preferably in the form of a rubber ring, which is larger than the opening and limits displacement of the support element for food to be grilled from below. Thus the safety of the grill device is advantageously increased. If the support element for food to be grilled should slide off during a vertical adjustment, it can slide down at most as far as the bulge and is caught by the bulge. Furthermore a rubber ring is advantageous, since it additionally has a cushioning effect.

In a further advantageous embodiment the holding elements have at least one horizontal section and preferably also a rounded section which as an extension of the vertical frame element connects the said element to the horizontal section. A horizontal section advantageously enables a spacing of the frame element from a rotational mounting. In this way a rotation approximately about a centre of gravity of the grill device is possible. Furthermore a rounded connection of the horizontal section of the holding elements to the vertical frame element saves on material.

In a further advantageous embodiment the frame elements are formed as a square tube with a preferably square cross-section and particularly preferably with rounded corners, and have at their end a cylindrical section of which the diameter is preferably smaller than a side thickness of the square tube. Here too the shape of the holding elements is not limited to the square shape. A rectangular shape, an elliptical shape as well as any other conceivable shape is possible. However, a square shape is advantageous since it can be produced in a particularly lightweight manner. Furthermore a cylindrical section at the end of the holding elements allows a particularly advantageous mounting of the device.

In a further advantageous embodiment in each case an eyebolt is arranged with its eye above the cylindrical section for rotatable fastening of the frame and the vertical longitudinal axis. An eyebolt is particularly simple and simultaneously stable. It enables a particularly precisely fitting arrangement of the eye of the eyebolt on the cylindrical section.

In a further advantageous embodiment the at least one support element for food to be grilled comprises at least one support dish for food to be grilled to receive liquid from the grill during the grilling operation. This is advantageous in particular since the support dish for food to be grilled collects the meat juices and the liquid fat which emanates from the food during grilling and prevents them from dripping onto further food to be grilled which is arranged below it. Thus an impairment of the flavour is precluded and the hygiene is improved. In the simplest case the support dish for food to be grilled is arranged releasably on the support elements for food to be grilled. This advantageously enables a quick removal of the cooked food to be grilled with the support dish for food to be grilled as well as quick restocking with raw food to be grilled. In a preparatory step the support dishes for food to be grilled are preferably stocked in each case with a chicken to be grilled and, if need be, the prepared support dish for food to be grilled is arranged on the corresponding support element for food to be grilled.

For releasable arrangement of the at least one support dish for food to be grilled on the at least one support element for food to be grilled it has proved advantageous if the support element for food to be grilled has a protuberance which is at least partially on the periphery and extends in the vertical direction. This protuberance preferably formed as an edge region serves to retain the at least one support dish for food to be grilled and prevents it from sliding off from the support element for food to be grilled during the grilling operation. In addition to such protuberances further holding elements are also conceivable, such as for example guide grooves or other types of indentations, which hold the at least one support dish for food to be grilled during the grilling operation on the support element for food to be grilled.

Each support element for food to be grilled which is provided preferably comprises a corresponding support dish for food to be grilled. The support dishes for food to be grilled are preferably made of metal, for example stainless steel or aluminium, or also of heat-resistant plastic.

Furthermore it would also be conceivable that at least one support element for food to be grilled should be reticulate and/or sponge-like, so that meat juices and liquid fat from the at least one support element for food to be grilled can be received and can be stored. For this purpose the at least one support element for food to be grilled can be designed for example with multiple layers and can comprise two mesh-like cover layers, for example made from metal, as well as an absorbent layer arranged between them and preferably made from natural and/or synthetic materials such as for example non-woven fabric, fibres or foamed plastics.

Advantageously the at least one support dish for food to be grilled has an edge region which widens upwards and extends on the periphery. Thus the at least one support dish for food to be grilled has an upwardly widening opening which preferably has a diameter of 10 to 30 cm, preferably 12 to 22 cm. The base surface of the support dish for food to be grilled is smaller by comparison with the opening and preferably has a diameter in the range from 8 to 25 cm, more preferably from 10 to 20 cm. Depending upon the type of food to be grilled the shell region arranged between the edge region and the base surface can have a different height. Of course it is also conceivable that the opening and the base surface have the same diameter or that the opening is smaller than the base surface. This is advantageous since a shell region which tapers conically upwards acts as a splash guard and meat juices and fat are collected without splashing. If a separate support dish for food to be grilled is omitted, the at least one support element for food to be grilled is formed as a support dish for food to be grilled and has an upwardly widening opening which preferably has a diameter of 10 to 30 cm, preferably 12 to 22 cm. The base surface of the shell-like support element for food to be grilled is smaller by comparison with the opening and preferably has a diameter in the range from 8 to 25 cm, more preferably from 10 to 20 cm. Depending upon the type of food to be grilled the shell region arranged between the edge region and the base surface can have a different height. Of course it is also conceivable that the opening and the base surface have the same diameter or that the opening is smaller than the base surface.

The at least one support element for food to be grilled advantageously comprises at least one positioning means for releasable arrangement of at least one support element inside the support element for food to be grilled. The at least one support element for food to be grilled preferably has at least one positioning means for releasable arrangement of at least one support element inside the support element for food to be grilled. This is advantageous since the support dish for food to be grilled is not sufficient for uniform grilling and thorough cooking of the food to be grilled, since always one side of the food to be grilled rests on it and thus is not properly grilled or not grilled at all. For this reason it is particularly advantageous to provide at least one support member on which the food to be grilled is arranged. In order to fix the support member releasably to the support element for food to be grilled, it is advantageous to provide at least one positioning means by means of which the support member can be releasably arranged in the best possible grilling position for the food to be grilled.

The support member advantageously comprises at least one base plate as well as a shaft-like extension arranged thereon. This is advantageous since the base plate is designed as a contact surface to the corresponding support element for food to be grilled, preferably to the support dish for food to be grilled, and thus serves for stabilisation of the entire support member. The shaft-like extension arranged on the base plate has an extension which extends upwards in the vertical direction and onto which the food to be grilled can be placed preferably downwards from above. Consequently in this embodiment the food to be grilled, in particular the chicken to be grilled, is likewise arranged vertically in its longitudinal direction. Due to the shaft-like extension the food to be grilled preferably has no contact with the support element for food to be grilled, preferably with the support dish for food to be grilled, so that uniform fast grilling and thorough cooking is possible when the grill device rotates about its vertical longitudinal axis during the grilling.

Furthermore it has proved advantageous to assign only one support member to each support element for food to be grilled, so that consequently only one piece of food to be grilled can be arranged with respect to each support element for food to be grilled. This is advantageous since due to the upright grilling of the food to be grilled the grilling operation can be shortened, since in contrast to the known fully stocked spits according to the known art the food to be grilled can also be cooked uniformly in the neck and breast region. In the prior art the fully stocked grill spit proves disadvantageous, since in particular the neck and upper breast region of the chicken to be grilled are shielded by the further chicken to be grilled which is arranged directly adjacent, resulting in longer grilling times, so that the meat quality also suffers and the chicken meat dries out.

Furthermore in the simplest exemplary embodiment it is conceivable for the shaft-like extension to be cylindrical, wherein the free upwardly directed end is closed and preferably rounded as a half-sphere. It is also conceivable that the shaft-like extension is formed with a downwardly extending bell shape, so that the food to be grilled has the largest possible common contact surface with the shaft-like extension. This is advantageous since as a result the grilling times are likewise shortened. Of course the form of the shaft-like extension is not limited to the cylindrical or bell shape, but can be changed in any way depending upon the shape of the food to be grilled. Furthermore it is conceivable that a plurality of shaft-like extensions, preferably two to eight, more preferably three to five, are provided. In a preferred embodiment these shaft-like extensions are cylindrical and preferably have an upwardly projecting free end which is chamfered on one side. This is particularly advantageous for the arrangement of the food to be grilled and the fixing thereof during the grilling operation. Furthermore, the free ends are preferably chamfered in the direction of the shaft-like extensions towards the vertical central axis of the support element for food to be grilled.

The shaft-like extension preferably has a vertical length in the range from 7 to 25 cm, preferably from 10 to 18 cm, and a horizontal width in the range from 2 to 8 cm, preferably in the range from 3 to 6 cm.

Advantageously the at least one positioning means is formed as at least one vertically upwardly extending projection, preferably a plurality of such projections, which are arranged spaced apart from one another. The at least one vertically upwardly extending projection is preferably angular, pyramidal or also rounded. Preferably a plurality of such projections are envisaged in order to enable a stable fixing of the support member on the support element for food to be grilled. Preferably at least one such projection, more preferably 2 to 15 such projections, most preferably 3 to 7 such projections are provided, which can be arranged in different geometries. Thus for example it is conceivable that a plurality of projections are arranged in a row, in a circular shape, as a rectangle or in any other possible geometry.

Advantageously the at least one support member has at least one recess which is complementary to the at least one positioning means of the support element for food to be grilled, preferably the support dish for food to be grilled, so that the latter can be introduced at least partially into the at least one recess for releasable fixing of the support member and support element for food to be grilled to one another, preferably on a support dish for food to be grilled. This is advantageous since thus a releasable fixing of the support member and support element for food to be grilled is provided, preferably on a support dish for food to be grilled. The at least one recess is preferably provided in the base plate of the support member or also directly on the lower free end of the shaft-like extension. Depending upon the configuration of the positioning means it is conceivable that for each positioning means a recess complementary thereto is provided in the support member. Furthermore it is also conceivable that a plurality of positioning means can be arranged in only one recess.

Preferably the support member, support element for food to be grilled, support dish for food to be grilled as well as positioning means are made of metal, preferably stainless steel or aluminium. For better cleaning it is also conceivable to modify the surface of the elements and/or of the positioning means or device physically and/or chemically.

The support member is preferably made from heat conducting material. This is advantageous in particular since thus the food to be grilled is not only supplied with heat from the outside but at the same time is also cooked from the inside. For this purpose it is advantageous if the shaft-like extension of the support member has at least partially, preferably completely, a direct contact surface with the food to be grilled. However, this is not inevitably necessary, since also the thermal radiation emitted by the shaft-like extension contributes indirectly to the cooking operation. As a result the grilling time is shortened, since the food to be grilled is heated not only from the outside but also from the inside. Preferably the geometric shape is adapted to the shaft-like extension of the internally located surface of the food to be grilled, which has at least partially a common contact surface with the shaft-like extension.

Due to the advantageous direct and/or indirect heating from the inside, uniform gentle cooking of the food to be grilled takes place, so that the grilling times are shortened.

Furthermore it is conceivable that the support member, preferably the at least one shaft-like extension, has at least one temperature sensor which serves for temperature measurement in the interior of the food to be grilled. In this way the grilling operation is more effective, since for example above a specific temperature threshold value in the interior of the food to be grilled it is possible to ascertain when the cooking time is reached and the food is not grilled dry.

Furthermore, in the case of a plurality of shaft-like extensions it has proved advantageous to provide at least one temperature sensor in each of the shaft-like extensions. This is advantageous for ascertaining the uniform cooking process and ascertaining when the food to be grilled is thoroughly cooked. Furthermore it is conceivable that the support member, preferably the at least one shaft-like extension or also a plurality of shaft-like extensions, has/have at least one heating element which is provided inside the respective shaft-like extension for indirect grilling. Due to this at least one heating element, which is designed for example as a heating wire, the food to be grilled is additionally heated from the inside, so that the grilling operation is completed more quickly. Moreover, this is advantageous since burning and drying out of the meat is prevented.

Advantageously a grill appliance is claimed for grilling food, in particular poultry, comprising a grill housing with at least one heating element, at least one grill device according to at least one of the preceding claims 1 to 10, at least one driving device for rotation of the grill device as well as at least one receiving arrangement for releasable fixing of the grill device on the grill housing. In order to use the grill device described above, a grill housing of preferred configuration with at least one heating element is required.

If in a first embodiment the grill appliance is equipped with only one grill device, the grill housing which at least partially surrounds the at least one grill device is preferably U-shaped. This is advantageous since thus during the rotation of the vertical grill device the food to be grilled is heated from three sides and is largely prevented from cooling. Advantageously the grill device is stocked with the food to be grilled outside the grill housing and is fixed, preferably by means of a clamping mechanism or detent mechanism, to the receiving arrangement of the grill housing in order then to be set in rotation by means of the at least one driving device, for example a motor.

If a plurality of grill devices are provided, which are preferably arranged adjacent to one another with the same spacing relative to one another, the grill housing is preferably formed as a planar wall element in which the at least one heating element, preferably a plurality of heating elements extend. Advantageously the grill housing is arranged so that it can be closed on its open front side which is not heated by at least one movable disc-like element. Preferably the disc-like element is designed to be pivotable as a side face of the grill housing, so that it is possible to close the grill compartment inside the grill housing in which the at least one grill device is arranged. This is advantageous since thus the heat emitted by the heating elements is retained inside the grill housing and thus the grilling operation takes place more quickly and more efficiently.

Furthermore it would be conceivable that the grill housing has two such planar wall elements, which are preferably arranged spaced apart and parallel to one another and between which the vertical rotating grill devices are arranged. This is advantageous since fast and cost-saving grilling is made possible by the heating on both sides in combination with the rotation about the vertical longitudinal axis of each grill device.

As a driving device for rotation of the grill device a motor drive is preferable or a chain drive or belt drive is also conceivable. If a plurality of grill devices are provided, it has proved advantageous for the grill devices arranged in a row relative to one another to be driven by means of a belt drive, for example by means of a toothed belt, all at the same rotational speed. Furthermore it is also conceivable that the individual grill devices arranged in a row relative to one another are each equipped with a drive, so that as a function of the food to be grilled the individual grill devices are driven at different rotational speeds. Depending upon the embodiment, the driving device can be arranged at the vertically upper end and/or at the vertically lower end of the grill device.

The fixing of the respective grill device on the receiving arrangement preferably takes place by means of a screw mechanism, a click mechanism or also a bayonet mechanism. Furthermore it is conceivable that the respective grill device has on the retaining frame at least one opening which is preferably at least partially engaged around by a retaining means, for example a hook-like element, so that the respective grill device is connected to the receiving arrangement by the retaining means. Moreover, in this case the grill device advantageously comprises at least one projection on the free end opposite the driving device. Preferably this at least one projection is formed like a pin and/or stud and can for example have a round cross-section or an ellipsoid cross-section. Furthermore it is advantageous that the at least one projection is arranged fixedly on the corresponding connecting element. Most preferably the at least one projection is formed as a guide pin and/or abutment. This is preferable since thus a vertical rotation of the grill device is possible during the grilling operation. The mounting of the grill device advantageously takes place in such a way that no eccentric forces are caused.

Before the stocking of the grill device with food to be grilled, the at least one projection of the grill device is first of all introduced into a recess and/or opening which is preferably complementary thereto in the grill appliance. In order to ensure easy, uniform rotation, an additional free volume inside which the at least one projection is rotatable is provided between the projection and the wall of the recess and/or the opening in the grill appliance. Most preferably a projection which, furthermore, is preferably formed as a guide pin and/or as an abutment, as well as an opening and/or recess complementary thereto, are provided per grill device. This causes a simple rotation of the grill device about the vertical longitudinal axis. Depending upon the embodiment the at least one projection can be arranged on the vertically downwardly oriented free end of the grill device and/or on the vertically upwardly oriented free end of the grill device, wherein the receiving arrangement or the driving device is preferably arranged on the other, opposing second free end of the grill device.

Furthermore, it is preferable that the retaining frame of the grill device has a coupling element, preferably a quick coupling, most preferably a slip coupling, by means of which the driving device is releasably connected. Most preferably the slip coupling is configured mechanically with friction elements, hydraulically, electrically, magnetically, as a belt drive and/or a combination thereof.

All disclosed features of the individual elements of the grill device are applicable and combinable in any way both on grill devices with only one retaining frame element and also on grill devices with two retaining frame elements.

Furthermore it has proved advantageous if the retaining frame is made up of individual parts releasably joined to one another. Thus for example it is conceivable that at least one retaining frame element can be releasably arranged on the first and/or second connecting element. The releasable fixing is preferably configured as a plug connection, a screw connection, a bayonet connection or the like. This embodiment proves advantageous in order to quickly remove the at least one retaining frame element and for example to clean it or to disinfect it.

The grill device described here for grilling food to be grilled is also designed not only for poultry but also preferably for pork, ham or the like.

Furthermore it has proved advantageous to remove the support elements for food to be grilled with pliers provided especially therefor. The pliers is designed for this in such a way that in the gripped state it fixes the base plate in the support dish for food to be grilled in such a way that the said plate is retained therein even if the support dish for food to be grilled is in an oblique position. This is advantageous in particular when liquid which has run out of the food to be grilled is to be extracted from the support dish for food to be grilled. This releasable fixing is independent of the angle of inclination of the support dish for food to be grilled.

BRIEF DESCRIPTION

Some of the embodiments will be described in detail, with reference to the following figures, wherein like designations denote like members, wherein.

DETAILED DESCRIPTION

Figure 1:
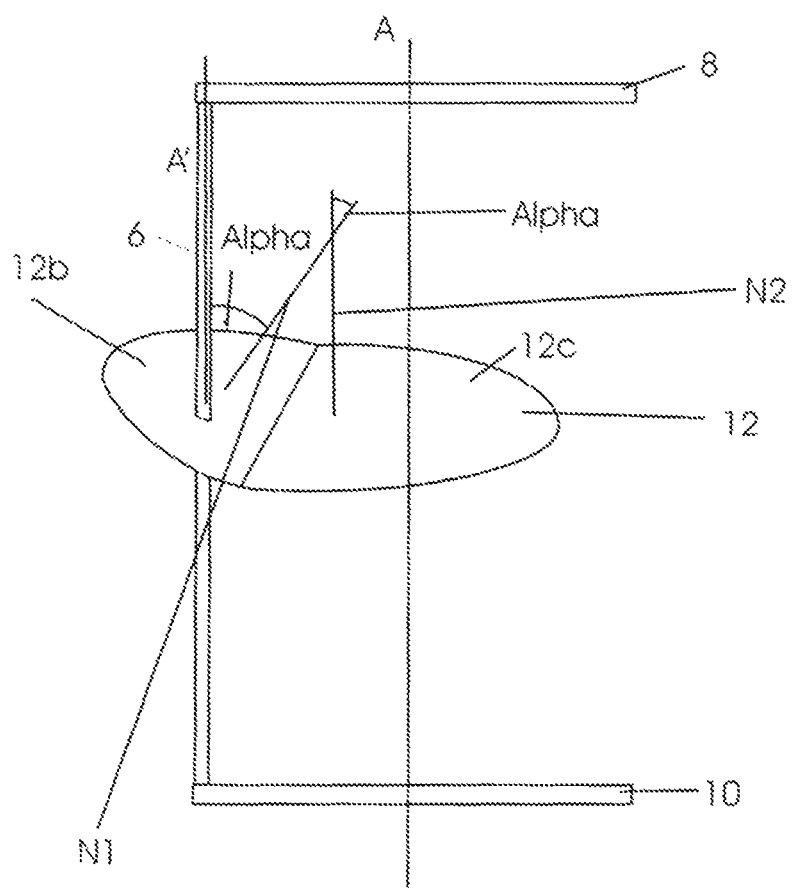
FIG. 1 shows a schematic representation of a grill device.

FIG. 1 shows an embodiment of a grill device 1, wherein the frame 2 consists of an upper horizontal holding element 8 and a lower horizontal holding element 10, which are spaced apart from one another by vertical frame element 6. The support element 12 for food to be grilled is arranged between the upper and lower holding element 8, 10. It consists of a first portion 12b and a second portion 12c, of which the normal vectors N1, N2 are oriented at an angle α relative to one another. It can also be seen that the normal vector N1 of the first portion 12b is oriented at the same angle α to the normal vector N2 of the second portion 12c as to the vertical longitudinal axis A, which is arranged parallel with the frame element 6. In this case the first portion 12b has an opening which is joined by form fitting with the frame element 6 in the illustrated position. It can also be seen that in a horizontal direction away from the frame element 6 the second portion 12c has a length which is at least three times as great as the length of the first portion 12b in this direction. In this way a force which enables adherent fixing of the support element 12 for food to be grilled at the vertical position with respect to the frame element 6 is exerted on the opening on the frame element 6 by the mass of the second portion 12c. In this case the shape of the support element 12 for food to be grilled is substantially adapted to a tongue.

Figure 2:
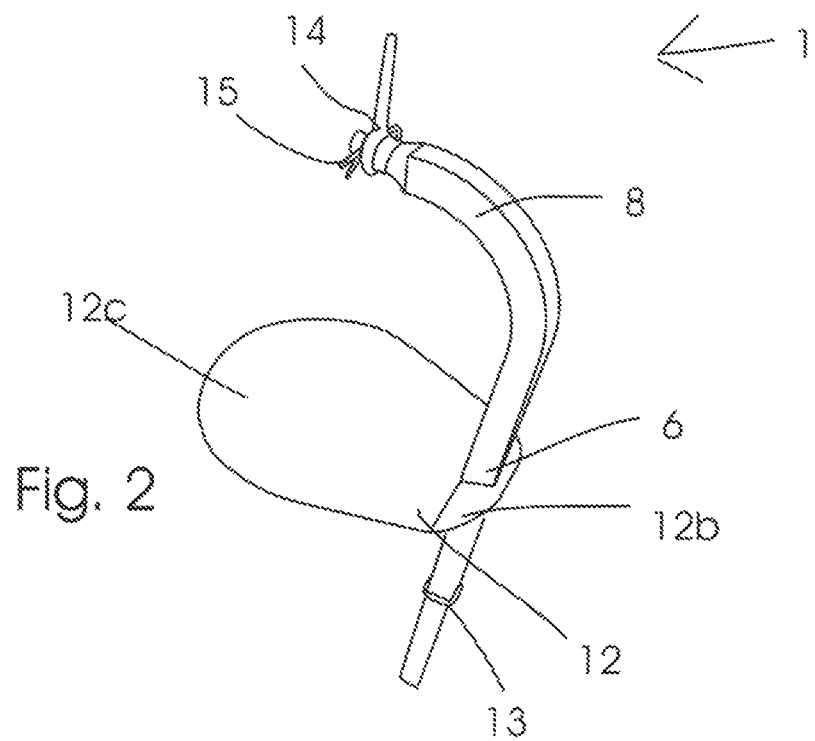
FIG. 2 shows a perspective view of the grill device.

FIG. 2 shows a perspective view of the grill device 1. In this case reference numerals not already introduced are necessarily repeated. It is additionally shown that on the frame element 6 on the periphery below the support element 12 for food to be grilled there is a bulge 13 which is larger than the opening and by which displacement of the support element 12 for food to be grilled is limited from below. In this depiction the bulge 13 is formed as a peripheral rubber ring. Furthermore the grill device 1 here has the characteristic that an upper holding element 8 has at least one horizontal section and a rounded section which as an extension of the vertical frame element 6 connects this element to the horizontal section of the upper holding element 8. Furthermore the holding elements 8, 10 and also the frame element 6 are formed as square tubes with a square cross-section, wherein the upper holding element 8 has at its end a cylindrical section, the diameter of which is smaller than a side thickness of the square tube. An eyebolt 14 which advantageously serves for rotatable fastening of the grill device 1 is arranged around this cylindrical section. The eyebolt 14 is retained by a spring clamp 15.

Figure 3:
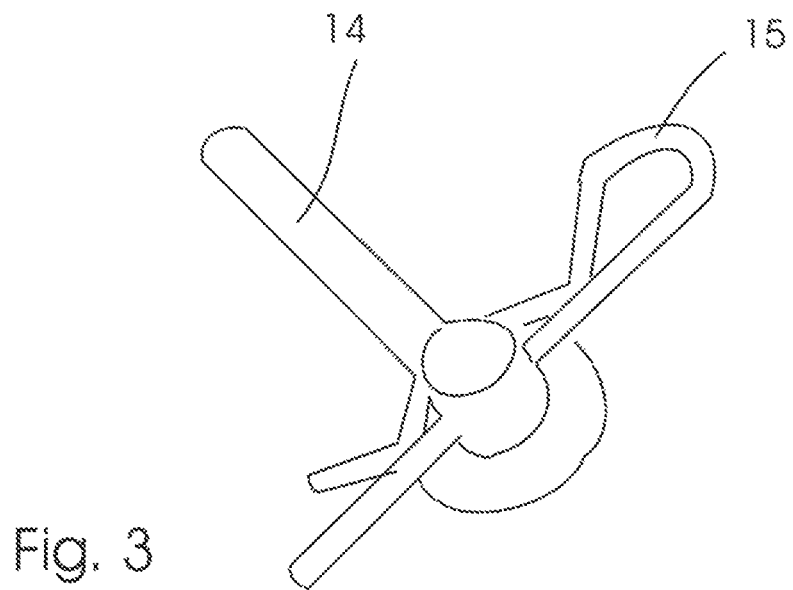
FIG. 3 shows a perspective view of an eyebolt, a cylindrical section at the end of a holding element and a clamping spring.

FIG. 3 shows more precisely the structure of the eyebolt 14 and the spring clamp 15 on the cylindrical section. While the eyebolt 14 is secured by a thickened area to the side of the holding element 8 facing the frame element 6, it is held on the other side by the said clamping spring 15. It consists of a straight rod, on the end of which a 180° rounding is arranged which has at the end a W-shaped section of which the points resiliently touch the first rod-shaped section. If a through bore in the radial direction is located on the cylindrical section, the rod-shaped section of the clamping spring can be introduced into the through bore, so that the central bulge of the "W" surrounds and clamps the radial section. In this way the eyebolt 14 is retained behind the clamping spring 15.

Figure 4:
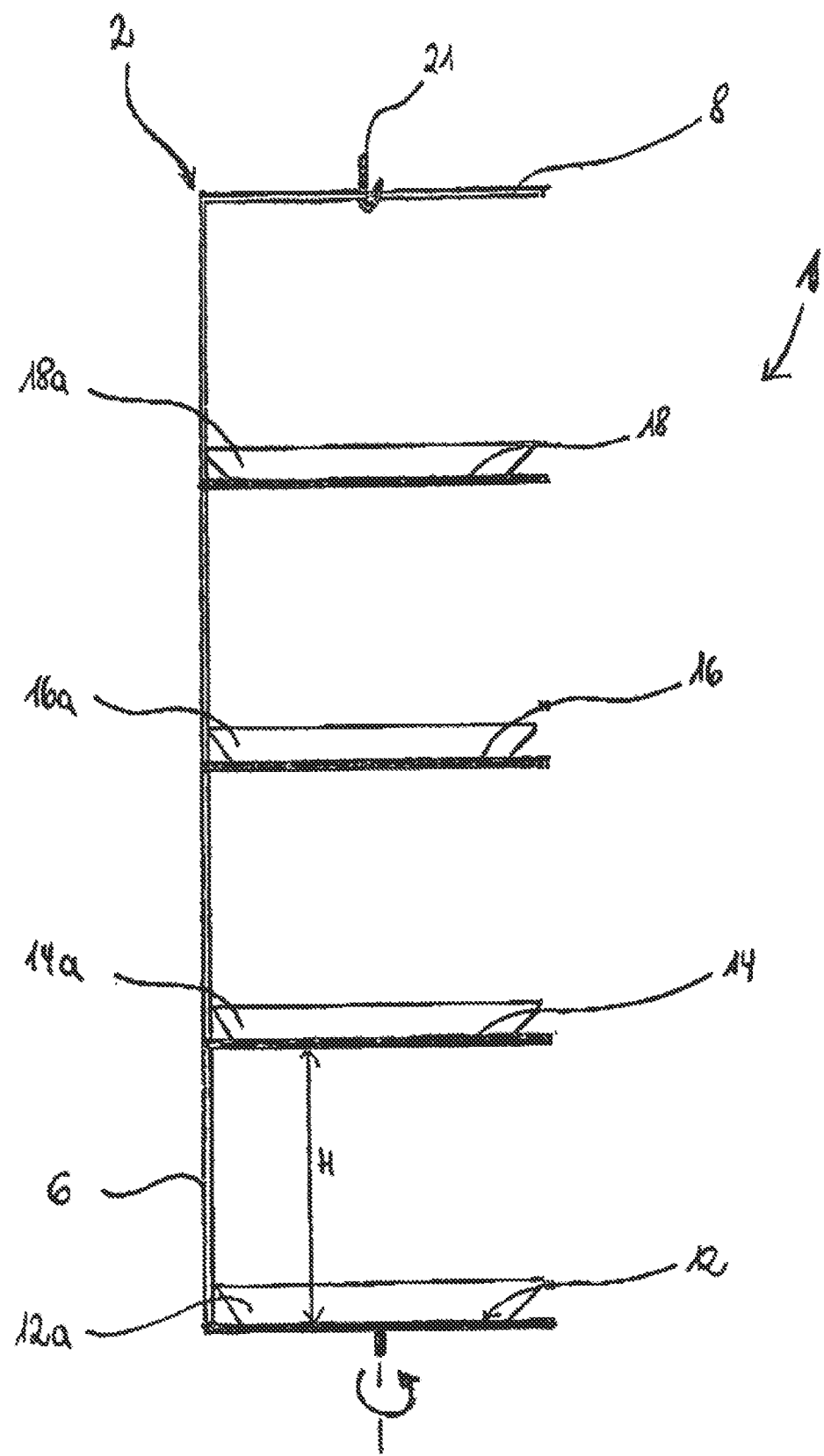
FIG. 4 shows a schematic cross-section of an embodiment of a grill device.

In FIG. 4 an embodiment of a grill device 1 is shown, wherein the frame 2 is formed by a frame element. The frame element is fixed to a holding element 8. In the simplest case, for the formation of the frame 2 a first support element 12 for food to be grilled, which is arranged on the frame element 6, is arranged on the underside. Thus the frame 2 is formed as a "U". Further support elements 14, 16, 18 for food to be grilled are arranged inside the frame 2. However, this should be understood as an example, so that the grill device 1 can also have more than the four support elements 12, 14, 16, 18 for food to be grilled which are illustrated here. The four support elements 12, 14, 16, 18 are illustrated here in a side view. It has proved advantageous to give a round form to the support elements 12, 14, 16, 18 for food to be grilled. Of course the formation of the support elements 12, 14, 16, 18 for food to be grilled is not limited to a round form, but for example can also be of angular, ellipsoid or also polygonal form.

A respective support dish 12a, 14a, 16a, 18a for food to be grilled is arranged in each case on the support elements 12, 14, 16, 18 for food to be grilled. The support dishes 12a, 14a, 16a, 18a for food have an upwardly widening cross-section and serve as receptacles for the food to be grilled during the grilling operation. The respective support dish 12a, 14a, 16a, 18a for food to be grilled is set up in each case on the support elements 12, 14, 16, 18 for food to be grilled. For additional fixing of the respective support dish 12a, 14a, 16a, 18a for food to be grilled on the corresponding support element 12, 14, 16, 18 for food to be grilled, the latter can have an at least partially peripheral protuberance extending vertically upwards and formed as an edge. This protuberance (not shown) prevents the respective support dish 12a, 14a, 16a, 18a for food to be grilled from sliding downwards during the grilling operation. Of course for retaining the support dishes 12a, 14a, 16a, 18a for food to be grilled, further possibilities are also conceivable which are suitable for releasable fixing of the support dishes 12a, 14a, 16a, 18a for food to be grilled.

The support dishes 12a, 14a, 16a, 18a for food to be grilled can advantageously be removed individually during the grilling operation. Depending upon the quantity of food to be grilled, the height H between two support elements 12, 14, 16, 18 for food to be grilled can be formed variably, wherein the height H preferably has a spacing in the range from 10 to 30 cm, preferably from 18 to 28 cm.

The holding element 8 preferably has a recess 19 (not shown), which is preferably formed as a peripheral groove. Furthermore this recess 19 is preferably arranged centrally on the holding element 8. By means of this recess 19 the grill device 1 is releasably fastened with a holding means 21, which is preferably formed as a hook-like element, to the receiving arrangement (not shown). In this embodiment the support elements 12, 14, 16, 18 for food to be grilled are fixed on the frame element 6 and the support dishes 12*a*, 14*a*, 16*a*, 18*a* for food to be grilled are arranged removably. During the grilling operation the grill device 1 is rotated about its vertical longitudinal axis A at a predeterminable speed. This enables uniform grilling of the food to be grilled from all sides.

Figure 5:
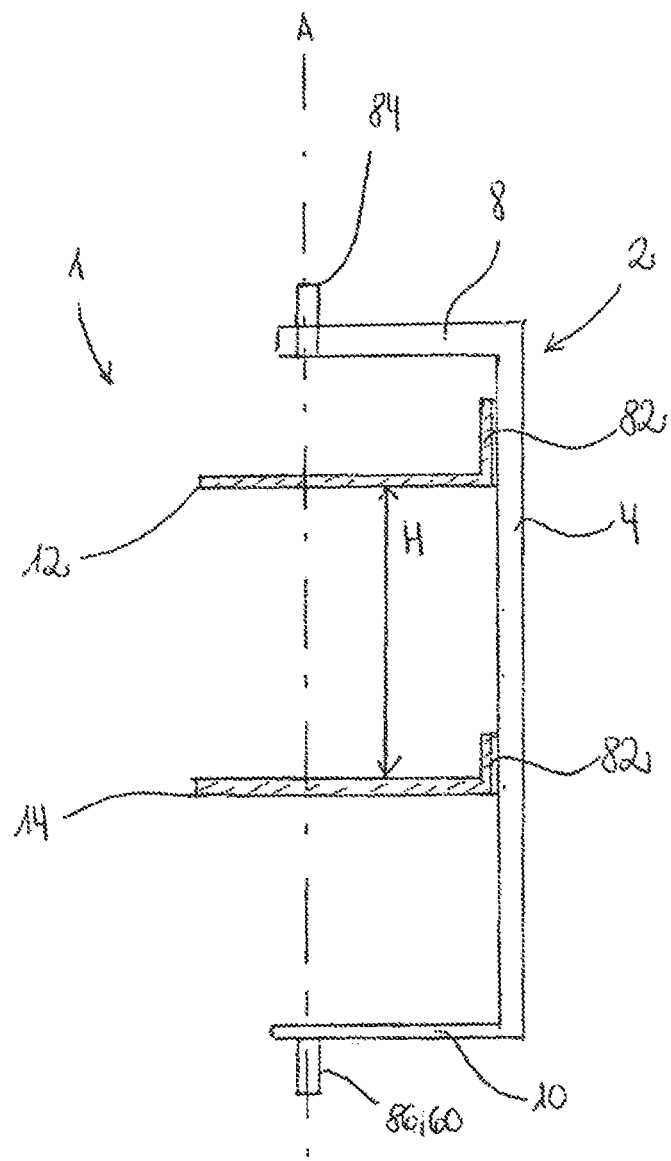
FIG. 5 shows a schematic cross-section of a further embodiment of a grill device.

FIG. 5 shows a further schematic cross-section of a grill device 1 with a U-shaped frame 2. The frame 2 comprises a frame element 4 which spaces two holding elements 8, 10 apart from one another. Furthermore the described further embodiment of a grill device 1 comprises two support elements 12, 14 for food to be grilled, which, however, should be understood here as merely for illustration. Of course, the grill device 1 illustrated here comprise more than the two illustrated support elements 12, 14 for food to be grilled. The support elements 12, 14 for food to be grilled each have a fixing section 82, by means of which the support elements 12, 14 for food to be grilled are arranged releasably on the frame element 4. Due to the releasable arrangement, the height H between the support elements 12, 14 for food to be grilled can be varied as required and can always be changed as a function of the food to be grilled. The height H is preferably in the range from 10 to 30 cm, preferably in the range from 18 to 28 cm.

At the upper vertical end of the grill device 1 the holding element 8 has a coupling element 84, by means of which the grill device 1 can be releasably connected to at least one driving device (not shown). At the lower vertical free end of the grill device 1 the further holding element 10 has at least one projection 86, which generally is preferably formed as a guide pin and/or as an abutment 60.

Of course the embodiment is not limited to this. If for example the driving device is provided in the vicinity of the lower vertical free end of the grill device, the arrangement of the coupling element 84 and the projection 86 or abutment 60 is interchanged.

Moreover in this exemplary embodiment the support elements 12, 14 for food to be grilled are designed to be larger in their longitudinal direction, so that they project beyond the two holding elements 8, 10. This is advantageous since thus the support dishes for food to be grilled (not shown) can be arranged stably on the support elements 12, 14 for food to be grilled.

The rotation of the grill device 1 illustrated here in FIG. 5 takes place about the axis of rotation A, which extends in the longitudinal direction of the grill device 1 centrally through the coupling element as well as the projection or abutment.

Figure 6:
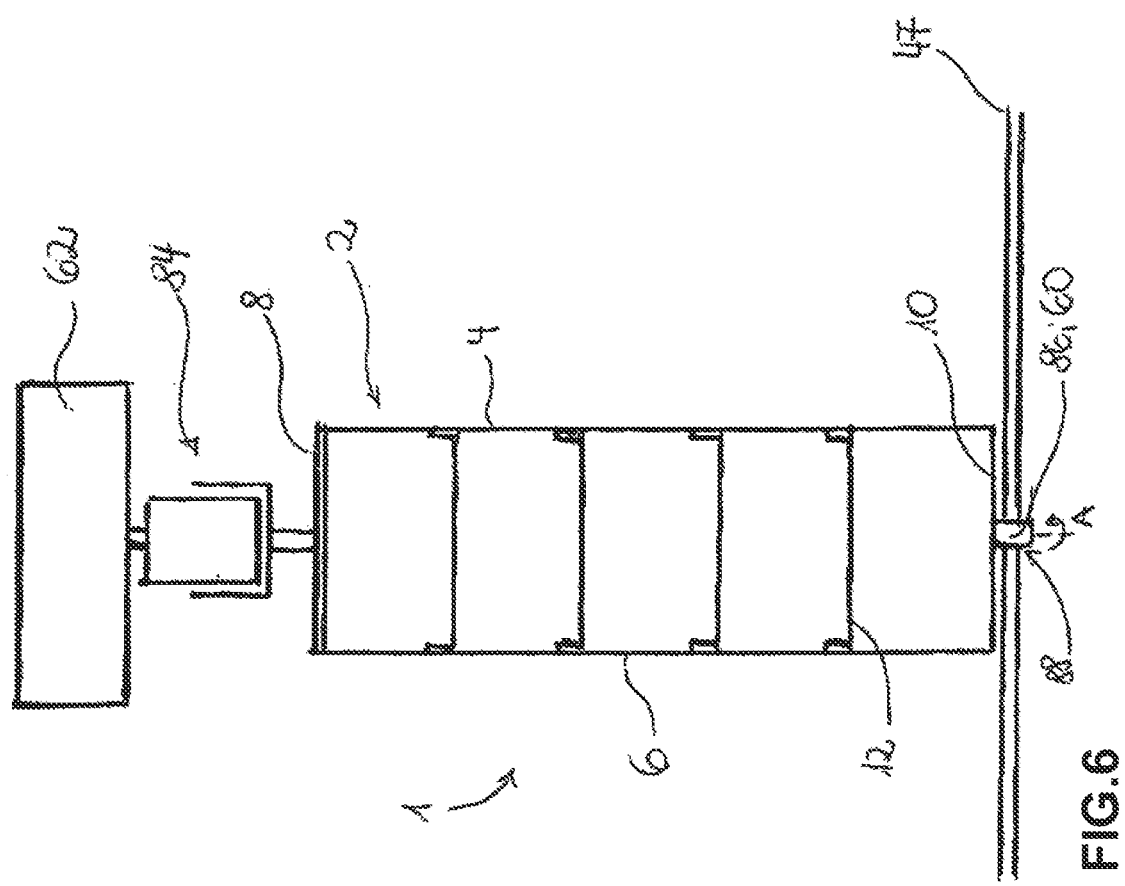
FIG. 6 shows a schematic cross-section of a further embodiment of a grill device.

FIG. 6 shows a further possible way of driving the grill device 1. The frame 2 here comprises a frame element 6 which spans an upper and lower holding element 8, 10 with a U-shaped frame. Moreover a driving device 62 is shown, which is releasably connected by means of a coupling element 84 to the grill device 1. In this example the coupling element 84 is preferably formed as a quick coupling, generally preferably as a slip coupling. At least one projection 86 and/or an abutment 60 which can be introduced into a complementary opening 88 in the grill appliance is arranged at the lower free vertical end of the grill device 1. A rotation of the grill device 1 about the axis of rotation A takes place during the grilling operation.

Figure 8:
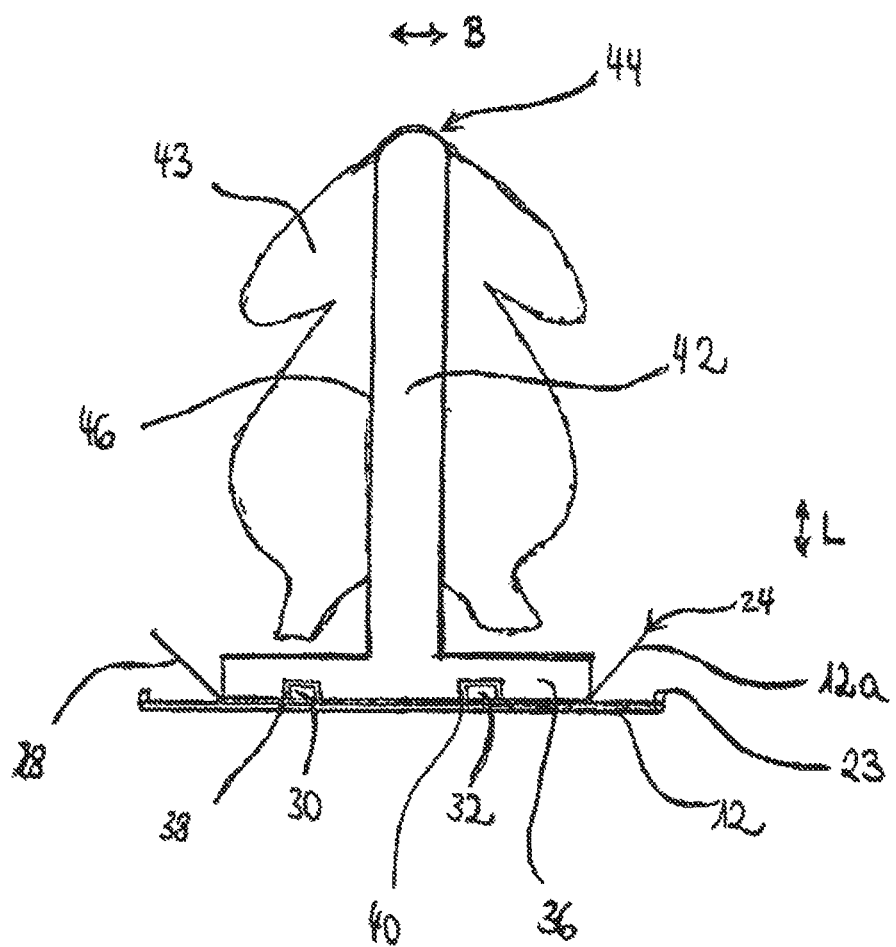
FIG. 8 shows a cross-section of an exemplary support element for food to be grilled with support element arranged therein.

FIG. 8 shows a schematic cross-section of a part of a grill device 1. On the periphery the grill support element 12 has at least a partial protuberance 23 which serves as a limiting means and which protects the support dish 12*a* for food to be grilled arranged on the support element 12 for food to be grilled against slipping or sliding off during the grilling operation. The base surface of the support dish 12*a* for food to be grilled has a smaller diameter than the upwardly directed opening, so that a conically upwardly widening shell region 28 is produced which terminates with an edge region 24 arranged on the periphery. The support dish 12*a* for food to be grilled preferably has two positioning means 30 and 32, which are formed as vertically upwardly extending projections. In this embodiment the projections are shown with an angular cross-section. Naturally, they are not limited to this form, but can also be provided with any other geometry, for example as an upwardly pointed triangle or also in the form of a sphere or half-sphere. The support element 34 which can be arranged inside the support dish 12*a* for food to be grilled preferably comprises a base plate 36, which has recesses 38 and 40 formed in a complementary manner to the positioning means 30 and 32, so that after the base plate 36 is inserted it is arranged, substantially displacement-free, in the support dish 12*a* for food to be grilled.

Moreover, the support element 34 comprises a shaft-like extension 42, which extends vertically upwards, and of which the free end 44 in this example is formed as a rounded half-sphere. The food to be grilled 43 is arranged schematically on this shaft-like extension 42. It is conceivable that at least one heating element (not shown) is arranged inside this shaft-like element 42, which here has a cylindrically arranged shell 46. This heating element can be arranged for example in a spiral form.

The shaft-like extension 42 preferably has a vertical length L in the range from 7 to 25 cm, preferably from 10 to 18 cm, and a width B in the range from 2 to 8 cm, preferably in the range from 3 to 6 cm.

If the support element 12 for food to be grilled is itself in the form of a dish and if a separate support dish 12*a* for food to be grilled is omitted, the fixing of the support element 34 described above is applicable analogously to the support element 12 for food to be grilled.

Figures 9A, 9B:
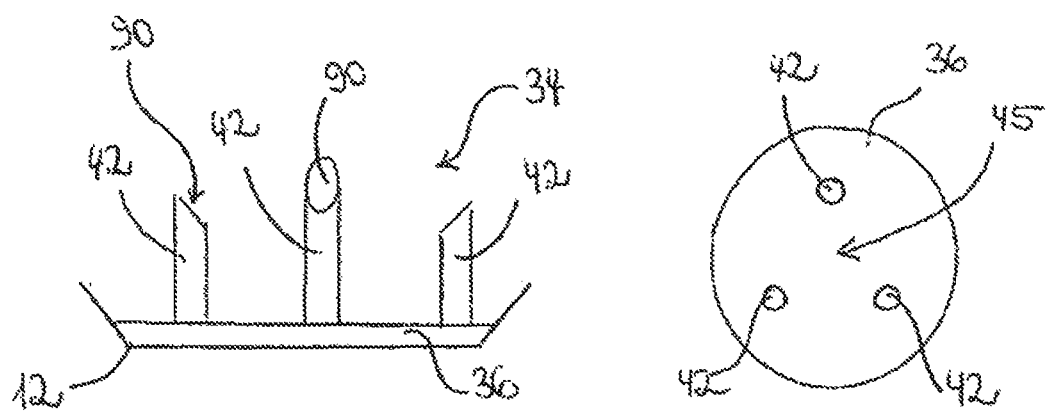
FIG. 9a shows a side view of a further embodiment of a support element.
FIG. 9b shows a top view of a further embodiment of a support element.

FIG. 9*a* shows a schematic side view of a further advantageous configuration of the support element 12 for food to be grilled with a support element 34 which comprises a base plate 36. For the sake of simplicity the fixing of the support element 34 is not described again here. Reference is made to the embodiment described above, in particular in FIG. 7. Furthermore, the support element 34 comprises three upwardly extending shaft-like extensions 42, the arrangement of which is made clear in the plan view in FIG. 8*b*. The triangular arrangement of the shaft-like extension 42 is preferably provided on the base plate 36 in such a way that the food to be grilled (not shown) can be arranged and fixed in the spanned intermediate region 45. The shaft-like extensions 42 are preferably formed cylindrically and in each case have a chamfered surface region 90 on their upwardly directed free end. These surface regions 90 preferably face one another. The chamfer is advantageously provided at an angle between 20 and 80°, most preferably between 30 and 50°. This chamfer is in particular advantageous, since in this way the food to be grilled which can be arranged in the intermediate region 45 can be easily positioned and fixed during the grilling operation.

The support element 12 for food to be grilled which is described here proves particularly advantageous for grilling pork or ham. Due to the upwardly extending, shaft-like extensions 42 the food to be grilled is held in such a way that in particular there is an improved circulation of heat in the base region of the support dish for food to be grilled, so that the food to be grilled is also cooked and grilled from below. Of course the embodiment is not limited to only three shaft-like extensions, but can be expanded in any way as a function of the amount of food to be grilled.

Furthermore it is conceivable that preferably at least two shaft-like extensions 42 are provided and these are preferably connected to a support element which in the simplest case is formed as a support ring (not shown). The food to be grilled is positioned on the support ring and is spaced apart from the support dish for food to be grilled by the upwardly extending shaft-like extension 42, so that circulation of heat is also favoured. The support element is preferably made from metal and/or plastic and/or composite material and/or a mixture thereof. In addition to metal, heat-resistant plastic proves particularly advantageous.

Figure 7:
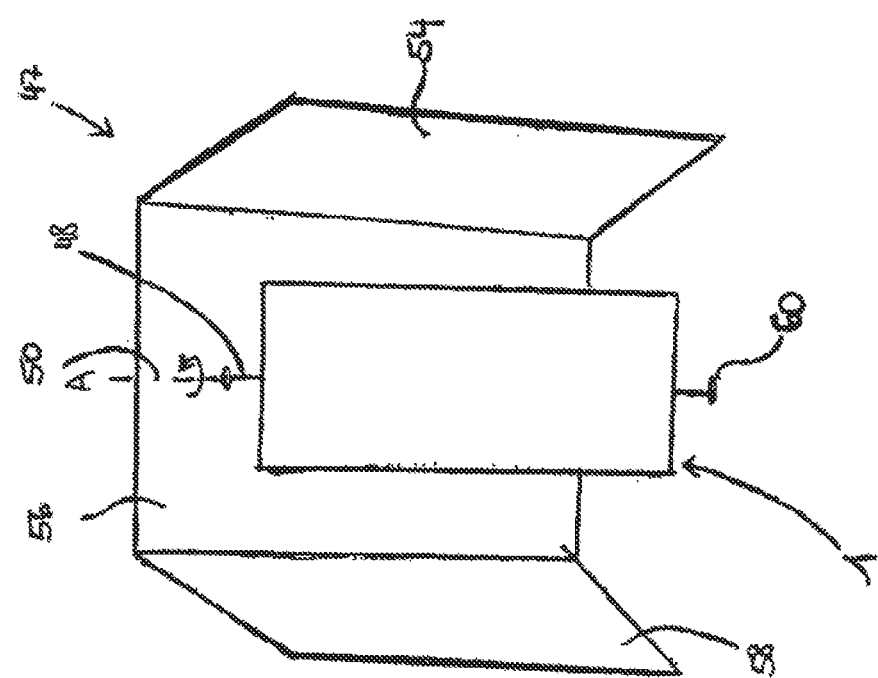
FIG. 7 shows an exemplary grill appliance.

FIG. 7 shows a schematic structure of a grill appliance 47 in which only one grill device 1 is provided. As shown in FIG. 1, the grill device 1 itself comprises a frame 2 as well as a frame element 6. The support elements for food to be grilled which are arranged in the frame 2 are not shown here for the sake of simplicity. The grill device 1 preferably has on its holding element 8, preferably on both holding elements 8, 10, a holding means 21 by means of which the grill device 1 can be releasably arranged on the receiving arrangement 50. The driving device (not shown here) causes a rotation of the grill device 1 about the vertical longitudinal axis A thereof.

In this exemplary embodiment the housing of the grill appliance 47 comprises a U-shaped heating element 52, which consists of a total of three flat heating portions 54, 56, 58. Moreover, it is preferably conceivable that the grill device 1 has an abutment 60, so that uniform rotation is possible. Naturally this should only be regarded as an example. Furthermore grill appliances are also conceivable which can accommodate a plurality of grill devices 1, in order that corresponding amounts of food to be grilled can be cooked simultaneously.

Figure 10:
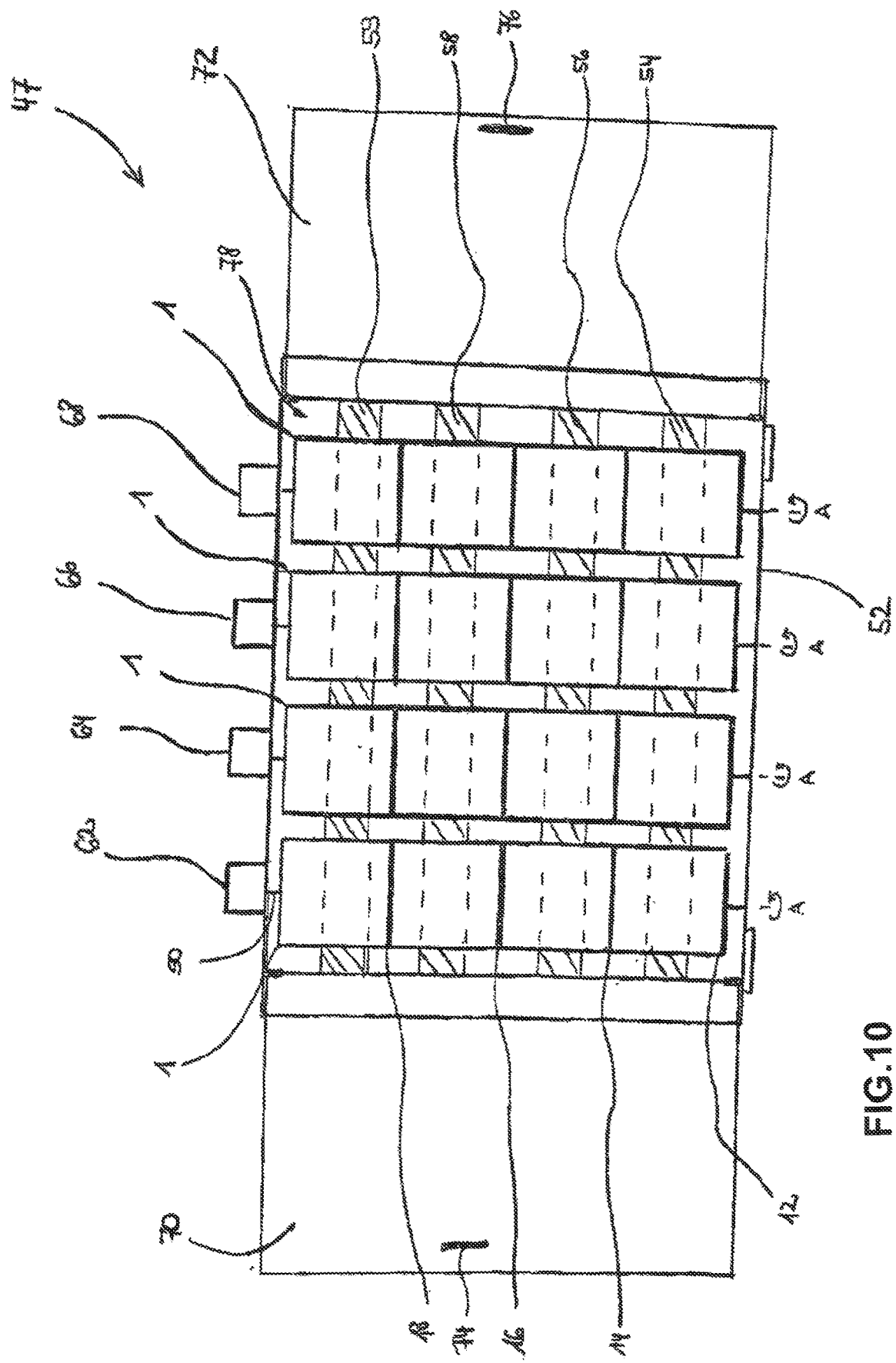
FIG. 10 shows a further exemplary grill appliance.

FIG. 10 shows a further grill appliance 47, which comprises a grill housing 52 as well as a total of four grill devices 1 arranged therein. In this case the four grill devices 1 are arranged in a row adjacent to one another. To aid understanding, the support dishes for food to be grilled and the food to be grilled are not illustrated here. However, it is self-evident that the support dishes for food to be grilled or the dish-shaped support elements for food to be grilled which are described above can be provided for the grill appliance 47 described here. The grill housing 52 preferably comprises a plurality of horizontally arranged heating elements 54, 56, 58, 59. The grill devices 1 are suspended by means of the holding means 21 (not shown) which is preferably formed as a hook-like element. The holding means 21 (not shown) serves as a link between the grill device 1 and the receiving arrangement 50.

The receiving arrangement 50 is connected in each case to a driving device 62, 64, 66, 68. The driving device is preferably understood to be a motor drive by means of which the respective grill device 1 is rotatable about its respective longitudinal axis A. It is conceivable that each grill device 1 has a separate driving device 62, 64, 66, 68, so that the four grill devices 1 shown here are rotatable at different speeds which are independent of one another. Furthermore, it is likewise preferable that only one driving device 62 is provided for all the grill devices 1, so that all the grill devices 1 are driven with the same rotational speed. The individual grill devices 1 are advantageously driven by means of a toothed belt (not shown) which is driven by the one driving device 62.

Furthermore the grill housing 52 advantageously comprises at least one, preferably two, movably arranged lateral faces 70, 72, which are most preferably arranged so as to pivot on the grill housing 52. The lateral faces 70, 72 preferably have two grip elements 74, 76, by means of which the two lateral faces 70, 72 can pivot. In the grill housing 52 illustrated in FIG. 6 the two lateral faces 70, 72 are shown in the open state in which they are pivoted outwards. In this state the food can be introduced into the grill device 1. If all the grill devices 1 are provided with food to be grilled (not shown), the two lateral faces 70, 72 are pivoted inwards and the grill compartment 78 is closed. The grill compartment 78 should be understood to be the space in which the grill devices 1 are arranged. The pivotable arrangement of the two lateral faces 70, 72 proves advantageous, since the food to be grilled is grilled in an almost closed grill compartment 78 and thus the grilling time is significantly shorter than in open grill appliances known from the prior art. The lateral faces 70, 72 are preferably made from heat-resistant, transparent material, so that the food to be grilled is visible and can be checked at any time without the grill housing 52 having to be opened. The lateral faces 70, 72 are preferably designed like doors.

Figure 11:
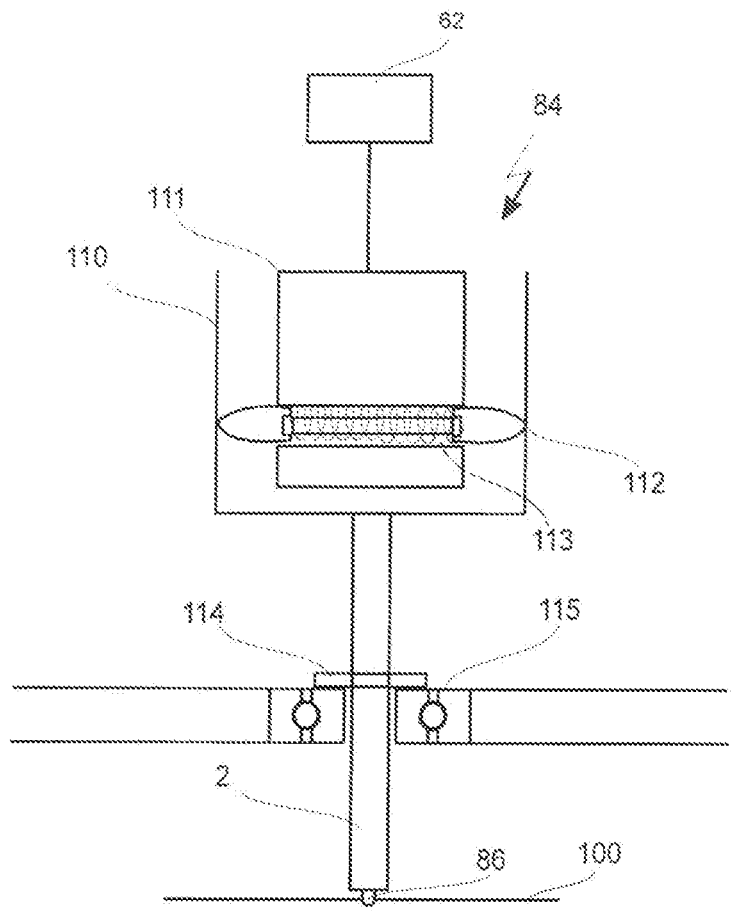
FIG. 11 shows a representation of a coupling according to embodiments of the invention.

FIG. 11 shows a possible configuration of a coupling element 84 according to embodiments of the invention. In this case the coupling element 84 consists of a cylinder 110 and a piston 111, wherein the coupling element 84 is force fitted between the cylinder 110 and the piston 111. The piston 111 is connected to a motor 62 and the cylinder 110 is preferably connected to the frame 2 by means of a thermally insulating element. In this depiction the frame 2 is only shown schematically without the individual parts thereof. It is also conceivable to transpose the positions of the piston 111 and the cylinder 110. Furthermore, in FIG. 11 an anti-friction bearing 115 is provided, preferably in an upper section of the frame 2. In the illustrated embodiment a guide rod with a pressing element 113, in particular a spring, is provided in the piston, and exerts a pressing force radially outwards. The contact surfaces 112 are provided on this spring, wherein the two contact surfaces 112 are preferably made from an abrasion-proof and/or elastic material, such as for example a hard rubber. Furthermore a bearing element 114 is provided, which bears on the inner ring of the anti-friction bearing 115, so that the frame 2 is suspended on the anti-friction bearing 115. The bearing element 114 can be formed as a thermally insulating element, for example as a ceramic disc. Furthermore it is possible that a projection 86 which is guided in a part of the housing 100 is provided on the underside of the frame 2. This guiding can prevent oscillation of the frame 2.

Figure 12:
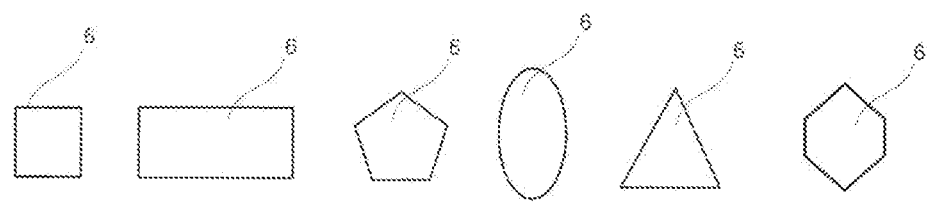
FIG. 12 shows possible cross-sectional configurations for the frame element.

FIG. 12 shows possible variants of a non-rotationally symmetrical cross-section of the frame element 6.

The combination of the disclosed features is offered purely by way of example. According to the invention the features can also be used individually and in different combinations.

The applicant reserves the right to claim all the features disclosed in the application documents as essential to the invention in so far as they are individually or in combination novel over the prior art. Furthermore it is pointed out that features which may be advantageous per se have also been described in the individual drawings. The person skilled in the art recognizes immediately that a specific feature described in a drawing may also be advantageous without the incorporation of further features from this drawing. Furthermore the person skilled in the art recognizes that advantages may also result from a combination of several features shown in individual drawings or in different drawings.

LIST OF REFERENCE SIGNS 1 grill device
2 frame
4 frame element
6 second retaining frame element
8 holding element
10 holding element
12, 14, 16, 18 support element for food to be grilled
12a, 14a, 16a, 18 a support dish for food to be grilled
19 recess
21 holding means
23 protuberance
24 edge region
28 shell region
30, 32 positioning means
34 support element
36 base plate
38, 40 recess
42 shaft-like extension
44 free end
45 intermediate space
46 shell
50 receiving arrangement
52 heating element
54, 56, 58, 59 flat heating portion
60 abutment
62, 64, 66, 68 driving device
70, 72 lateral faces
74, 76 gripping element
78 grill compartment
81 fastening means
82 fixing section
84 coupling element
86 projection
88 further opening
90 surface region
100 coupling
110 cylinder
111 piston
112 contact surfaces
113 pressing element
114 bearing element
115 anti-friction bearing
B breadth
H height
L length
A longitudinal axis
N1 normal vector of first portion
N2 normal vector of second portion

The invention claimed is:

1. A grill device for grilling food to be grilled, comprising at least one frame, with at least one frame element as well as with at least one holding element which is arranged at one end of the at least one frame element, wherein the grilling device is rotatable about a vertical longitudinal axis, and also with at least one support element for the food to be grilled,
wherein the grill device is suspended and/or mounted upright along the vertical rotational axis and the at least one support element for the food to be grilled has a first portion which has an opening through which the at least one frame element can be inserted,
wherein the at least one frame element has a non-rotationally symmetrical cross-section such that the at least one support element for the food to be grilled and the at least one frame element co-operate by interlocking with respect to a normal plane of the vertical longitudinal axis,
wherein the at least one support element for the food to be grilled has an asymmetric weight distribution with respect to the opening, so that the at least one support element for the food to be grilled and the at least one frame element co-operate with respect to the vertical longitudinal axis by force fitting, forming a clamp connection,
wherein, in a form fitting connection position, the first portion of the at least one support element is inclined relative to the normal plane to form the clamp connection,
wherein the at least one support element for the food to be grilled has a second portion which is configured to receive at least one of the food to be grilled and a plate for the food to be grilled,
wherein, in the form fitting connection position between the at least one support element for the food to be grilled and the at least one frame element, the second portion extends substantially in a horizontal direction.

2. The grill device according to claim 1, wherein the opening has, in a horizontal direction, a length which is greater than the thickness of the at least one frame element.

3. The grill device according to claim 1, wherein in a horizontal direction away from the at least one frame element the second portion has a length which is at least three times as great as the length of the first portion in this the horizontal direction away from the at least one frame element.

4. The grill device according to claim 1, wherein the at least one frame element has a further holding element on the underside of the at least one frame element and/or a guide in the normal plane of the vertical longitudinal axis.

5. The grill device according to claim 1, wherein the at least one frame element is produced by drawing and has a curved region, wherein the profile of the at least one frame element tapers in the curved region.

6. The grill device according to claim 1,
wherein the at least one holding element comprises an upper holding element, and
wherein an anti-friction bearing is arranged above the upper holding element in the direction of the vertical longitudinal axis.

7. The grill device according to claim 6, wherein a part of the upper holding element extends upwards in the direction of the vertical longitudinal axis and is guided by the anti-friction bearing.

8. The grill device according to claim 7, wherein the part of the upper holding element which is guided by the anti-friction bearing has at least one bearing surface for the holding element to bear on the anti-friction bearing.

9. The grill device according to claim 1,
wherein the plate for the food to be grilled has an underside with a guide which is adapted to the shape of the second portion of the at least one support element for the food to be grilled, wherein the plate for the food to be grilled is removable in a radial direction but is retained in a direction of rotation.

10. The grill device according to claim 9, wherein the plate for the food to be grilled has at least one protuberance for holding the food to be grilled with a cavity.

* * * * *